(12) United States Patent  (10) Patent No.: US 9,218,811 B2
Alameh  (45) Date of Patent: Dec. 22, 2015

(54) ELECTRONIC DEVICE AND METHOD FOR MANAGING VOICE ENTERED TEXT USING GESTURING

(71) Applicant: Motorola Mobility LLC, Libertyville, IL (US)

(72) Inventor: Rachid Mohsen Alameh, Crystal Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 205 days.

(21) Appl. No.: 13/962,216

(22) Filed: Aug. 8, 2013

(65) Prior Publication Data

US 2015/0006172 A1 Jan. 1, 2015

Related U.S. Application Data

(60) Provisional application No. 61/840,774, filed on Jun. 28, 2013.

(51) Int. Cl.
| | |
|---|---|
| *G10L 15/00* | (2013.01) |
| *G10L 15/04* | (2013.01) |
| *G10L 15/26* | (2006.01) |
| *G10L 15/22* | (2006.01) |

(52) U.S. Cl.
CPC ............ *G10L 15/22* (2013.01); *G10L 2015/221* (2013.01); *G10L 2015/227* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 6,374,214 B1 * | 4/2002 | Friedland et al. | 704/235 |
| 6,418,410 B1 * | 7/2002 | Nassiff et al. | 704/251 |
| 6,618,697 B1 * | 9/2003 | Kantrowitz et al. | 703/22 |
| 6,859,774 B2 * | 2/2005 | Mangu et al. | 704/255 |

(Continued)

FOREIGN PATENT DOCUMENTS

| | | |
|---|---|---|
| WO | 02080144 A1 | 10/2002 |
| WO | 2011143720 A1 | 11/2011 |

OTHER PUBLICATIONS

Daniel P., Samsung Galaxy S IV to introduce touchless gestures for screen navigation, http://www.phonearena.com/news/Samsung-Galaxy-S-IV-to-introduce-touchless-gestures-for-screen-navigation_id39559, Feb. 7, 2013, all pages.

(Continued)

*Primary Examiner* — Jesse Pullias

(74) *Attorney, Agent, or Firm* — Shumaker & Sieffert, P.A.

(57) ABSTRACT

An electronic device for managing voice entered text using gesturing comprises a housing, display, power source, speech recognition module, gesture recognition module, and processor. A first speech input is detected, and textual words are displayed. One or more swipe gestures are detected, and a direction of the swipe gesture(s) is determined. Each textual word is highlighted one-by-one along a path of the direction of the swipe gesture(s) highlighting for each swipe gesture. For one embodiment, a second speech input may be detected and a highlighted textual word may be substituted with a second textual word. For another embodiment, a type of the swipe gesture(s) may be determined. A textual word adjacent to a currently highlighted word may be highlighted next for the first type, and a textual word non-adjacent to the currently highlighted word may be highlighted next for the second type.

20 Claims, 20 Drawing Sheets

(56) References Cited

U.S. PATENT DOCUMENTS

2002/0002459 A1\* 1/2002 Lewis et al. .................. 704/260
2011/0310005 A1 12/2011 Chen et al.
2013/0275130 A1\* 10/2013 Nada et al. .................. 704/235

OTHER PUBLICATIONS

Jon Fingas, Elliptic Labs develops touchless gesture control for Windows 8, assuages our fear of fingerprints (video), http://www.engadget.com/2012/11/14/elliptic-labs-develops-touchless-gesture-control-for-windows-8/, Nov. 14, 2012, all pages.

\* cited by examiner

ELECTRONIC DEVICE AND METHOD FOR MANAGING VOICE ENTERED TEXT USING GESTURING

FIELD OF THE DISCLOSURE

The present disclosure generally relates to wireless and wired communication and more particularly to manipulating voice entered text using one or more gestures.

BACKGROUND

Advancements in wireless communication technology have greatly increased the versatility of today's wireless communication devices. The wireless communication devices have evolved from simple mobile telephones and pagers into sophisticated devices that are capable of performing a variety of functionalities. As the sophistication of mobile devices has increased, so has the demand for more robust and intuitive mechanisms for providing input to such devices, such as speech recognition and gesture recognition technologies. Conventional devices use touch or contactless gesture recognition mechanisms to enable a user to provide inputs to the device via motions or gestures. Speech recognition (SR) is basically the translation of spoken words into text. The speech recognition is a powerful mechanism that turns the mobile phone into a powerful writing tool, without having to lift a stylus or type on a touch screen.

Speech-to-text is a mechanism that enables a user to provide voice inputs (speech) that are converted into textual words and displayed on an electronic device. However, there are at least two situations where a user would not want to use Voice to control the electronic device. The first is a noisy environment and the second is while talking in close proximity to other people. In a noisy environment, ambient noise may lead to misinterpreting of spoken words. For example, while driving in a vehicle with an electronic device in a dock, a user may send messages generated via speech-to-text operation. Based on the background noise or perhaps due to a misspoken word, user's speech can be misinterpreted by the electronic device resulting in incorrect text entry. A simple, low distraction, effective means or method is proposed to correct wrong entries without requiring excessive interaction with the device to minimize distraction.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
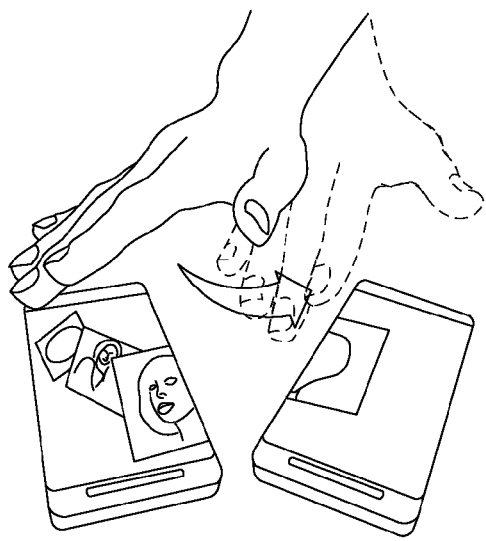
FIGS. 1A-1C are schematic illustrations CS41422 of wireless gestures and their recognition by the electronic devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and a method in an electronic device for managing voice entered text using gesturing is disclosed herewith. One aspect is a method which comprises detecting a first speech input and displaying a plurality of textual words in response to the first speech input, in which the plurality of textual words includes at least one textual word. The method further includes detecting at least one contactless swipe gesture and determining a direction of the at least one contactless swipe gesture. The method involves highlighting, one-by-one for each contactless swipe gesture of the at least one contactless swipe gesture, each textual word being displayed along a path of the direction of the at least one contactless swipe gesture. Thereafter, the method further includes detecting a second speech input and substituting a highlighted textual word of the path of the direction of the at least one contactless swipe gesture with a second textual word in response to detecting the second speech input, wherein the second textual word corresponds to the second speech input.

Another aspect is a method which comprises detecting a first speech input and displaying a plurality of textual words in response to the first speech input, in which the plurality of textual words includes at least one textual word. The method also includes detecting at least one swipe gesture and determining a direction of the at least one swipe gesture and a type of the at least one swipe gesture, in which the type includes a first type and a second type. The method further includes highlighting, one-by-one for each swipe gesture of the at least one swipe gesture, each textual word being displayed along a path of the direction of the swipe gesture. A textual word adjacent to a highlighted word is highlighted instead of the highlighted word for the first type of the at least one swipe gesture, and a textual word non-adjacent to the highlighted word is highlighted instead of the highlighted word for the second type of the at least one swipe gesture.

Yet another aspect is an electronic device comprising a housing, a display supported by the housing, a power source supported by the housing, a speech recognition module, a gesture recognition module, and a processor. The speech recognition module is configured to detect a first speech input and a second speech input. The gesture recognition module is configured to detect at least one contactless swipe gesture and determine a direction of swipe gesture. The processor is configured to display a plurality of textual words in response to the first speech input, and highlight one-by-one each textual word being displayed along a path of the direction of the swipe gesture. The processor controls the substitution of a highlighted textual word with a second textual word when the second speech input is detected, in which the second textual word corresponds to the second speech input.

Still another aspect is an electronic device comprising a housing, a display supported by the housing, a power source supported by the housing, a speech recognition module, a gesture recognition module, and a processor. The speech recognition module is configured to detect a first speech input. The gesture recognition module is configured to detect a swipe gesture and determine a direction and a type of at least one swipe gesture, in which the type includes a first type and a second type. The processor is configured to display a plurality of textual words in response to the first speech input. The processor is also configured to highlight, one-by-one for each swipe gesture of the at least one swipe gesture, each textual word being displayed along a path of the direction of the swipe gesture. A textual word adjacent to a highlighted word is highlighted instead of the highlighted word for the first type of the at least one swipe gesture, and a textual word non-adjacent to the highlighted word is highlighted instead of the highlighted word for the second type of the at least one swipe gesture.

Figure 1B:
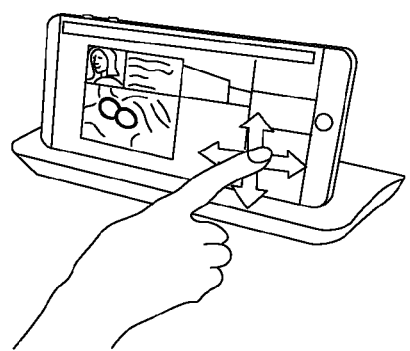
Figure 1C:
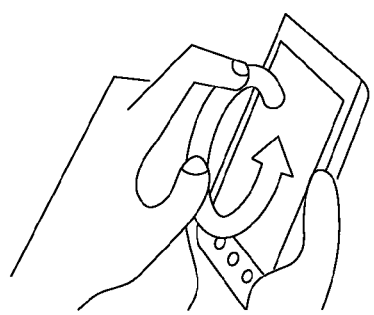

FIGS. 1A, 1B, and 1C, show examples of performing contactless gesture recognition for an electronic device, such as a mobile device. FIG. 1A illustrates a motion for a hand gesture at a particular distance from a flat surface of the device, FIG. 1B illustrates a motion for a finger gesture at the particular distance, and FIG. 1C illustrates a non-linear motion of a hand or finger gesture at the particular distance. Simple, contactless gestures may control various types of functions of the electronic device, such as music, applications, games, or gallery, without touching the electronic device. Both touch gesturing and contactless gesturing may utilized for the embodiments described herein, but contactless gesturing in particular enhances a user experience and facilitates user interaction.

Moreover, it is to be understood that FIG. 1 is provided merely for the purpose of illustrating the principles of the present invention. FIG. 1 is not intended to be a comprehensive schematic diagram of all of the components of such a communication system. Therefore, electronic device may comprise various other configurations and still be within the scope of the present disclosure.

Figure 2:
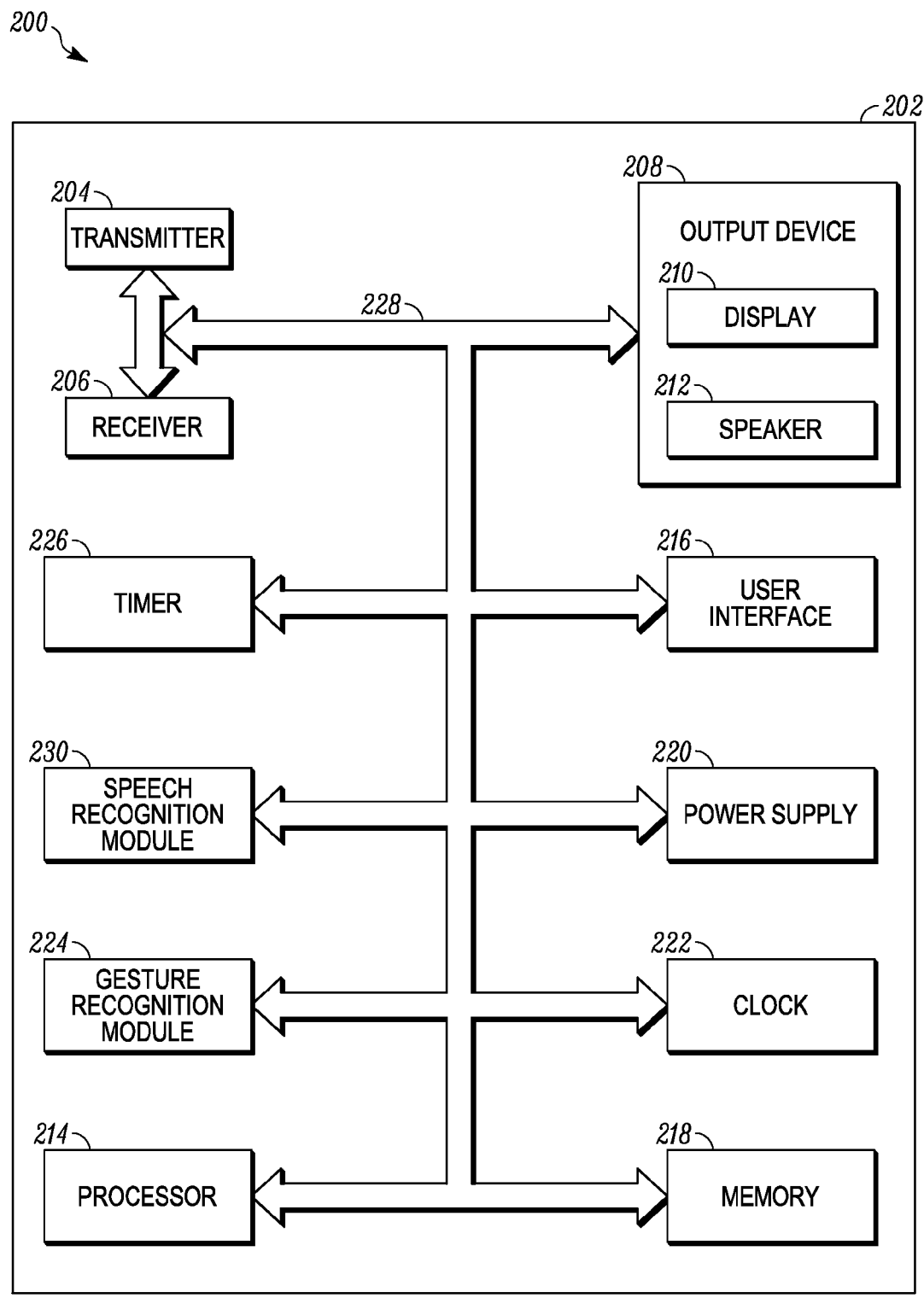
FIG. 2 is a block diagram showing example internal components of the electronic device in accordance with some embodiments of the present invention.

Referring to FIG. 2, there is provided a block diagram 200 illustrating example internal hardware components of the electronic device 202. For the purposes of the explanation below, the block diagram 200 will be referred to as describing internal hardware components of a electronic device 202. The electronic device 202 or electronic device can be a mobile device. However, the electronic device 202 is intended to be representative of a variety of other electronic devices. In some embodiments, for example, the electronic device 202 can be any of a call receiver, cellular telephone, a personal digital assistant (PDAs), a smart phone, a handheld or portable electronic device, a headset, a MP3 player, a battery-powered device, a wearable device, a radio, a navigation device, a laptop or notebook computer, a netbook, a pager, a PMP (personal media player), a DVR (digital video recorder), a gaming device, a camera, an e-reader, an e-book, a tablet device, a navigation device with a video capable screen, a multimedia docking station, or a similar mobile or computing device.

The block diagram 200 of the electronic device 202 includes various components. The example components include a transmitter 204, a receiver 206, an output device 208 including a display 210 and an acoustic output device such as a speaker 212, a processor 214, a user interface 216, a memory 218, a power supply 220, a clock 222, a speech recognition system 230, a gesture recognition system 224, and a timer 226, each capable of communicating with one or more components of the electronic device 202. For example, as shown in FIG. 2, all components are coupled to a bidirectional system bus 228, having one or more of a data communication path, a control communication path or a power supply path.

The transmitter 204 enables the electronic device 202 to transmit and the receiver 206 enables the electronic device 202 to receive RF signals through an antenna (not shown). In accordance with the embodiment, the receiver 206 converts the RF signals received from the antenna to digital data for use by the processor 214. Each transmitter 204 and/or the receiver 206 of the electronic device utilizes wireless technology for communication, such as, but are not limited to, peer-to-peer or ad hoc communications such as Bluetooth, Zigbee, near field communication, infrared, peer-to-peer Wifi, wireless HDMI, wireless USB, HomeRF, and the like. The transmitter 204 and the receiver 206 shown in FIG. 2 also represent possible transceivers of the electronic device 202. In addition to the above described technologies, each wireless transceiver, transmitter and/or receiver may also utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants.

The output device 208 may generate visual indications of data generated during operation of the processor 214. The visual indications may include prompts for human operator input, calculated values, detected data, etc. Additionally, the output device 208 may include a video output component such as a display device 210 which may include one or more of the following components: a cathode ray tube, a liquid crystal display, a plasma display, an incandescent light, a fluorescent light, a front or rear projection display, or a light emitting diode indicator. Other examples of output components 208 include an audio output component such as a speaker 212, alarm and/or buzzer, and/or a mechanical output component such as vibrating or motion-based.

In accordance with an embodiment, the user interface 216 may be connected to the processor 214 for entering data and commands in the form of text, touch input, gestures, etc. The user interface 216 is, in one embodiment, a touch screen device but may alternatively be an infrared proximity detector or any input/output device combination capable of sensing gestures and/or touch including a touch-sensitive surface. In addition, the user interface 216 may include one or more additional components, such as a video input component such as an optical sensor (for example, a camera), an audio input component such as a microphone, and a mechanical input component such as button or key selection sensors, a touch pad sensor, another touch-sensitive sensor, a capacitive sensor, a motion sensor, and/or a pointing device such as a joystick and buttons used on laptop or notebook computers, a track ball, a touch pad, a rocker switch, a touch screen, a TTY input device for disabled persons, a Braille key input, or a pad for an electronic stylus, for example. The user interface 216 enables a user of the electronic device 202 to provide an input for the electronic device 202. It is to be understood that any reference to an infrared proximity detector or IR sensor in this disclosure includes, but is not limited to, near infrared (NIR) and short wave infrared (SWIR) imagers and detectors.

Still referring to FIG. 2, the memory 218 may be used to store data and instructions for the operation of the processor 214. In the various embodiments, the memory 218 may be one or more separate components and/or may be partitioned in various ways for various purposes such as but not limited to, optimizing memory allocations, etc. Thus it is to be understood that the example memory 218 illustrated in FIG. 2 are for illustrative purposes only, for the purpose of explaining and assisting one of ordinary skill in understanding the various embodiments described herein.

Additionally, the power supply 220, such as a battery, may be included in the internal components of the electronic device 202 for providing power to the other internal components while enabling the electronic device 202 to be portable.

Furthermore, the gesture recognition system 224 of FIG. 2 is configured to recognize contact less gestures. Gesture recognition system may include proximity sensors for proximity detection. The speech recognition system 230 is configured to recognize text information from received speech information. The speech information system, in conjunction with the processor 214, recognizes the speech inputs and correspondingly displays textual words on the display 210 of the electronic device 202. The timer 226 is synchronized with the clock 222 and measures time intervals. In another embodiment, the timer 226 and the clock 226 can be integrated together.

Moreover, the processor 214 operates in conjunction with the data and instructions stored in the memory 218 to control the operation of the electronic device 202. The processor 214 may be implemented as a microcontroller, a digital signal processor, hard-wired logic and analog circuitry, or any suitable combination of these.

It is to be understood that FIG. 2 is for illustrative purposes only and is primarily for, although not solely for, explaining the information stored in memory for the various embodiments of an electronic device in accordance with the present disclosure, and is not intended to be a complete schematic diagram of the various components and connections for an electronic device. Therefore, a electronic device will comprise various other components not shown in FIG. 2, and/or have various other internal and external configurations, and still be within the scope of the present disclosure. Also, one or more of these components may be combined or integrated in a common component, or components features may be distributed among multiple components. Also, the components of the electronic device 202 may be connected differently, without departing from the scope of the invention.

Figure 3:
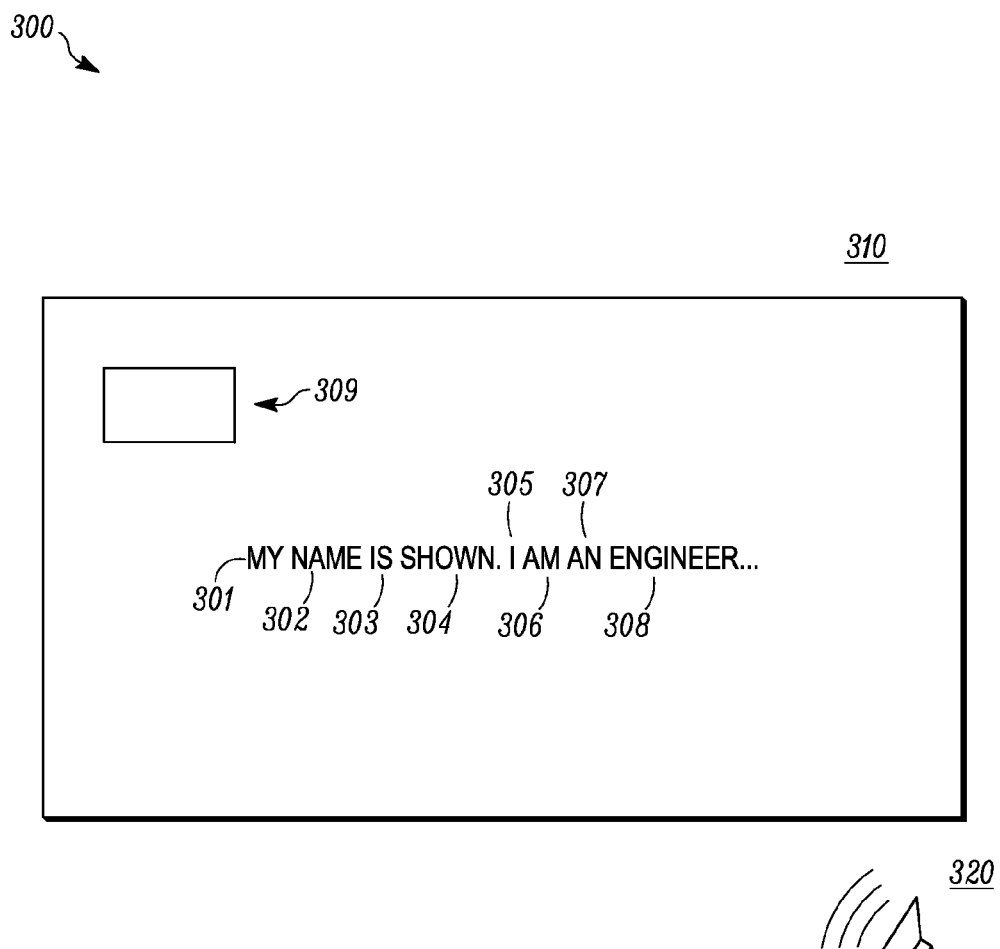
FIG. 3 is a schematic view illustrating an implementation of the electronic device 202.

Referring to FIG. 3, there is provided a schematic view 300 illustrating example display 310 of the electronic device 202 of the FIG. 2. Herein, the electronic device 202 of FIG. 2 includes display 310 along with the microphones 309. The schematic view 300 shows a user or speaker 320 that provides a speech input. In another embodiment, the speech input may be provided by a human user. In the present example, the user 320 provides speech inputs. The proximity of the user or speaker is defined by a distance that is no further than what is required for speech recognition The speech inputs are detected by the electronic device and accordingly, the plurality of textual words are displayed on the display 310. For example, the textual words may be provided as a phrase or sentence as dictated by the user. Each textual word that is displayed corresponds to at least one speech input. In other words, the display 310 displays a plurality of textual words in response to the speech inputs by the user/speaker 320. In the present example, the textual words "My name is shown. I am an engineer", based on the detected speech inputs, are shown to be displayed on the display 310. The textual words "MY NAME IS SHOWN. I AM AN ENGINEER" are represented by reference numerals 301-308.

Figure 4A:
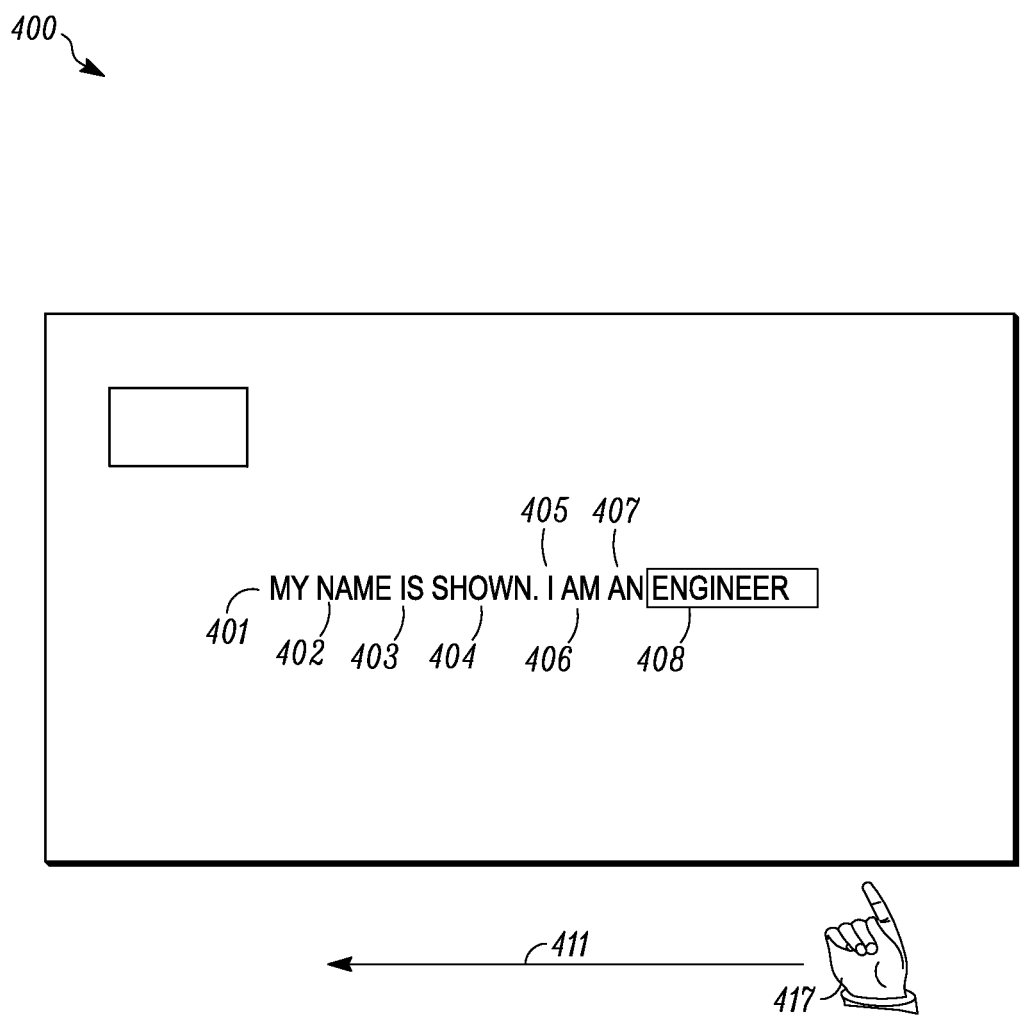
FIGS. 4A-4C are schematic views illustrating an implementation of the electronic device 202.
Figure 4B:
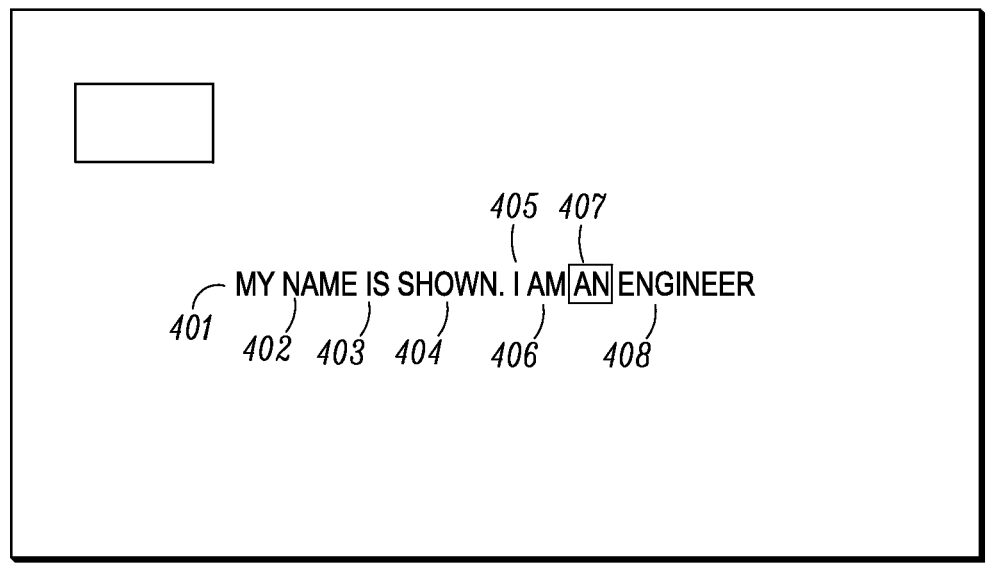
Figure 4B:
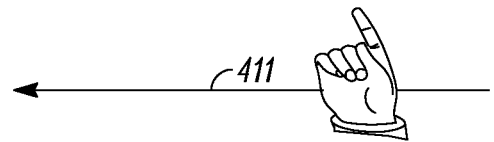
Figure 4C:
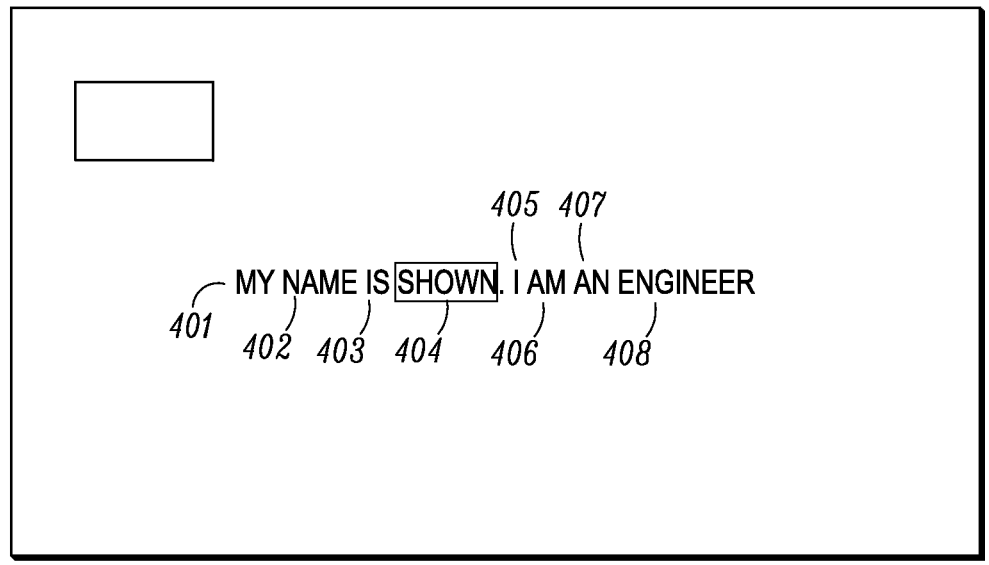

Referring to FIG. 4A, there is provided a schematic view 400 illustrating an implementation of the electronic device 202. FIGS. 4A-4C shows textual words "MY NAME IS SHOWN. I AM AN ENGINEER" represented by reference numerals 401-408. For example, the user 320 of the FIG. 3 provides speech inputs to the electronic device 202. The user 320 realizes that one of the plurality of textual words is spelled incorrectly. In the present embodiment, the incorrect textual word is taken to be textual word 404 "Shown" as shown in FIG. 4A. The user intends to correct the textual word 404 "Shown". The user uses a contactless swipe gesture in a direction 411. Herein, the contact less swipe gesture is made by the movement of a human hand 417, wherein the hand 417 moves along the direction 411. The direction 411 may be any number of a variety of directions capable of being indicated by user input. For example, FIG. 4A represents the direction 411 to be a linear indicator in a horizontal, or substantially horizontal, direction relative to the displayed text. In accordance with the present embodiment, the contact less swipe gesture is detected by the gesture recognition system 224 of FIG. 2. The gesture recognition system 224 also detects the direction of the contact less swipe gesture. The processor 214, in conjunction with the gesture recognition system 224, highlights the first textual word 408 displayed in the direction 411 of the contact less swipe gesture. Herein, the textual word 408 is the first textual word to be highlighted. The textual words displayed along the path of the direction 411 of the contactless swipe gesture get highlighted. As the swipe gesture continues in the detected direction 411, the subsequent textual word 406 "an" is highlighted as shown in FIG. 4B. In other words, the detected contact less swipe gesture highlights, one by one, each textual word that is displayed along the path of the direction 411 of the swipe gesture. The processor 214 of FIG. 2 dehighlights the previously highlighted textual word while highlighting the textual word in the direction 411. In other words, the contactless swipe gesture highlights, one by one, each textual word while dehighlighting, one by one, each previously highlighted textual words in path of the direction 411. In the present example, as the textual word 406 "an" is highlighted while the textual word 408 "Engineer" is dehighlighted as the swipe gesture moves from textual word 408 to textual word 406.

The contactless swipe gesture may be, for example, detected by a proximity sensor, such as an IR sensors or ultrasonic sensors. Further, the highlighting provides a visual feedback to the user 320 in response to the speech inputs. In another embodiment, the processor 214 can provide an audio feedback of each of the textual words being highlighted. In other words, each textual word is read out, one by one, as the swipe gesture moves in the direction 411.

Figure 5:
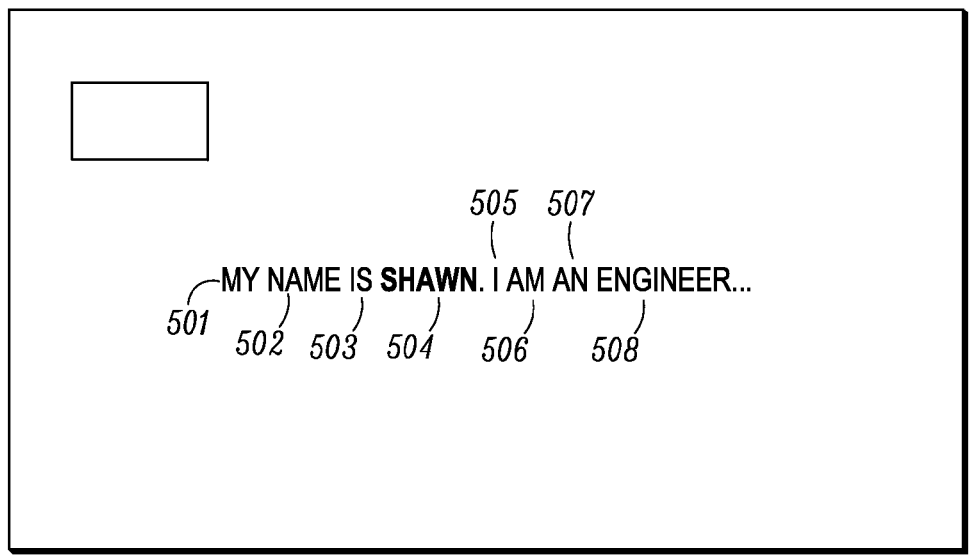
FIG. 5 is a schematic view illustrating an implementation of the electronic device 202.
Figure 5:
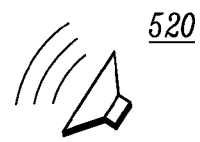

Referring to FIG. 4C, there is provided a schematic view 400 illustrating an implementation of the electronic device 202. After the subsequent highlightings of each textual word displayed in the path of the direction 411 of the contactless swipe gesture, the textual word 404 "Shown" is highlighted. The textual word 404 "Shown" is a misspelled textual word. In other words, the textual word 404 "Shown" is the word that the user intends to correct. As the desired textual word, herein the textual word 404, is highlighted, the user provides a speech input. The speech input includes a new textual word and the textual word 404 is replaced by the new textual word 504 as shown in FIG. 5 of the present embodiment. Herein, the new textual word 504 that replaces the textual word 404

"Shown" is spelled "Shawn" as shown in FIG. 5. FIG. 5, further, shows textual words "MY NAME IS SHAWN. I AM AN ENGINEER" represented by the reference numerals 501-508.

Figure 6A:
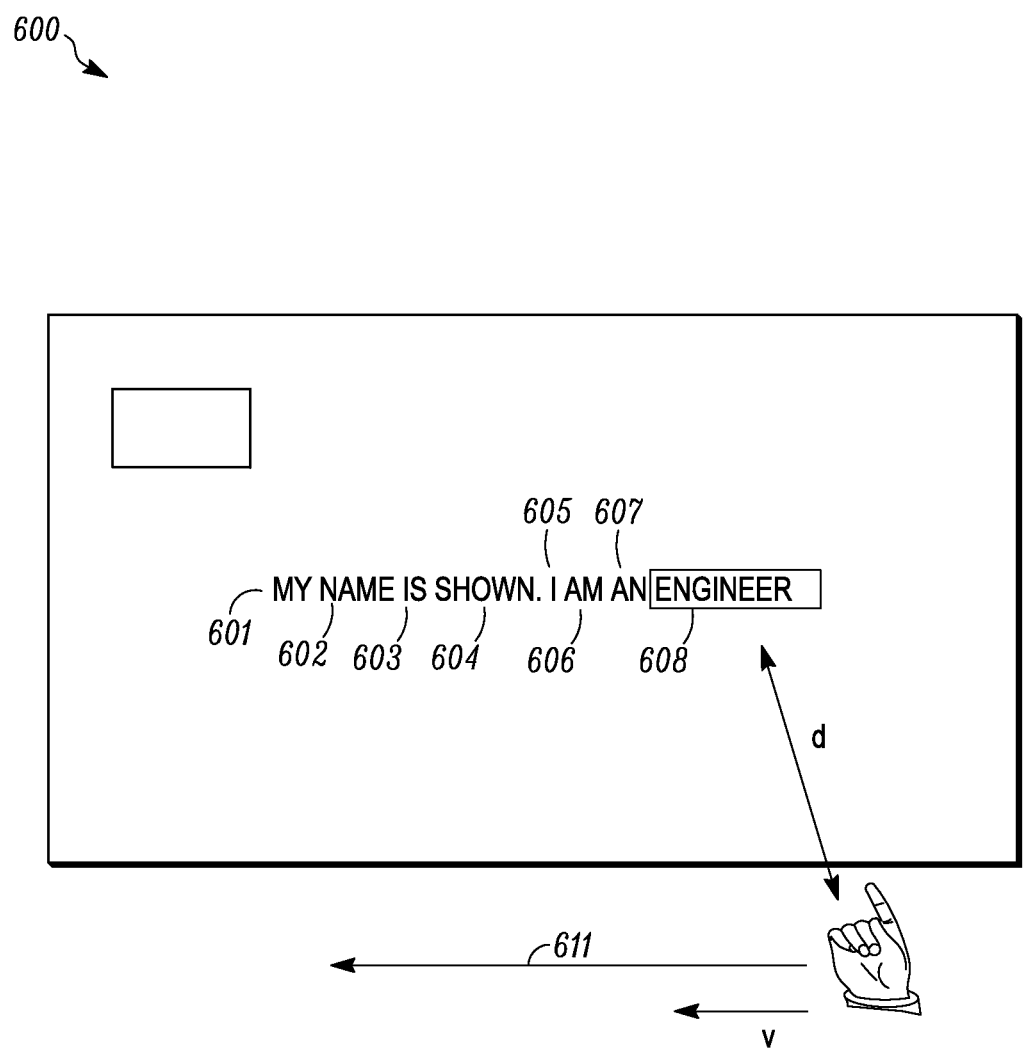
FIGS. 6A-6C are schematic views illustrating an implementation of the electronic device 202.
Figure 6B:
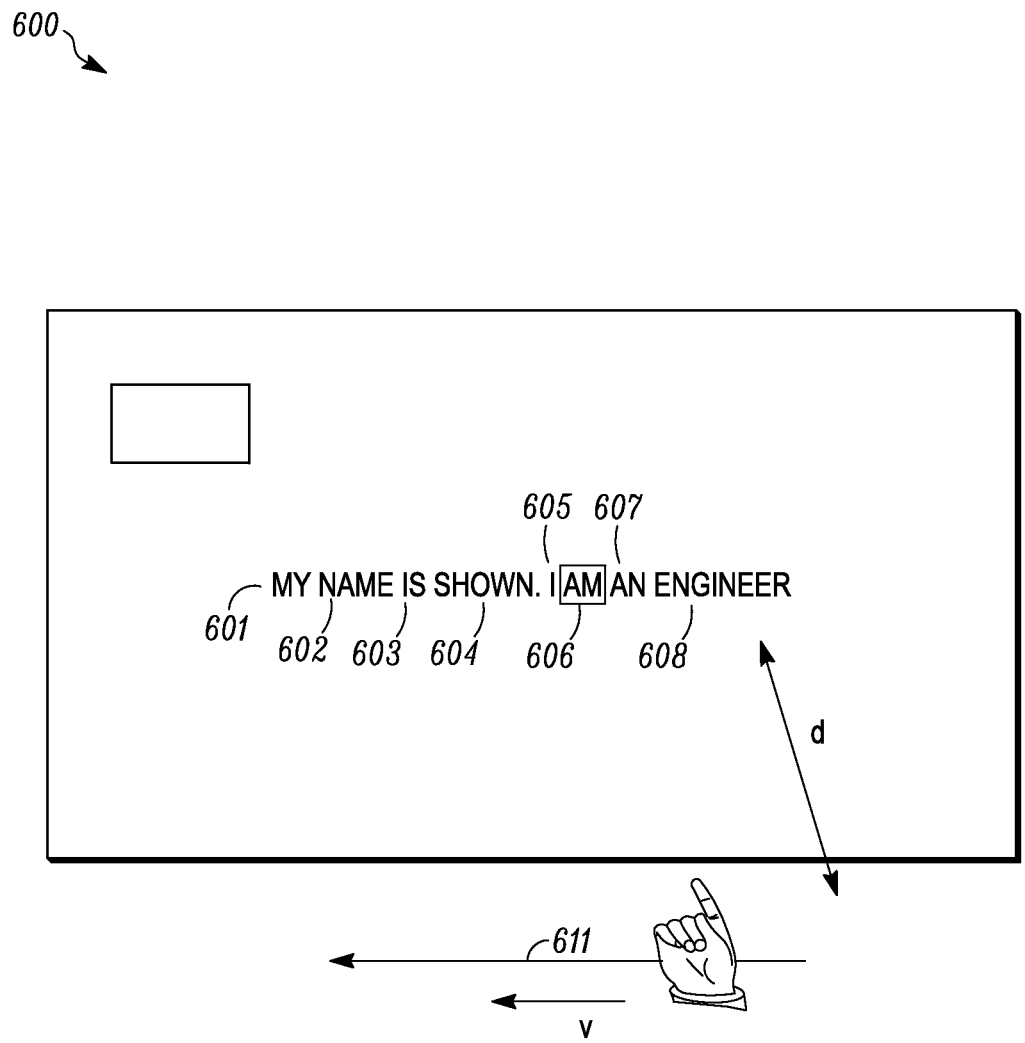
Figure 6C:
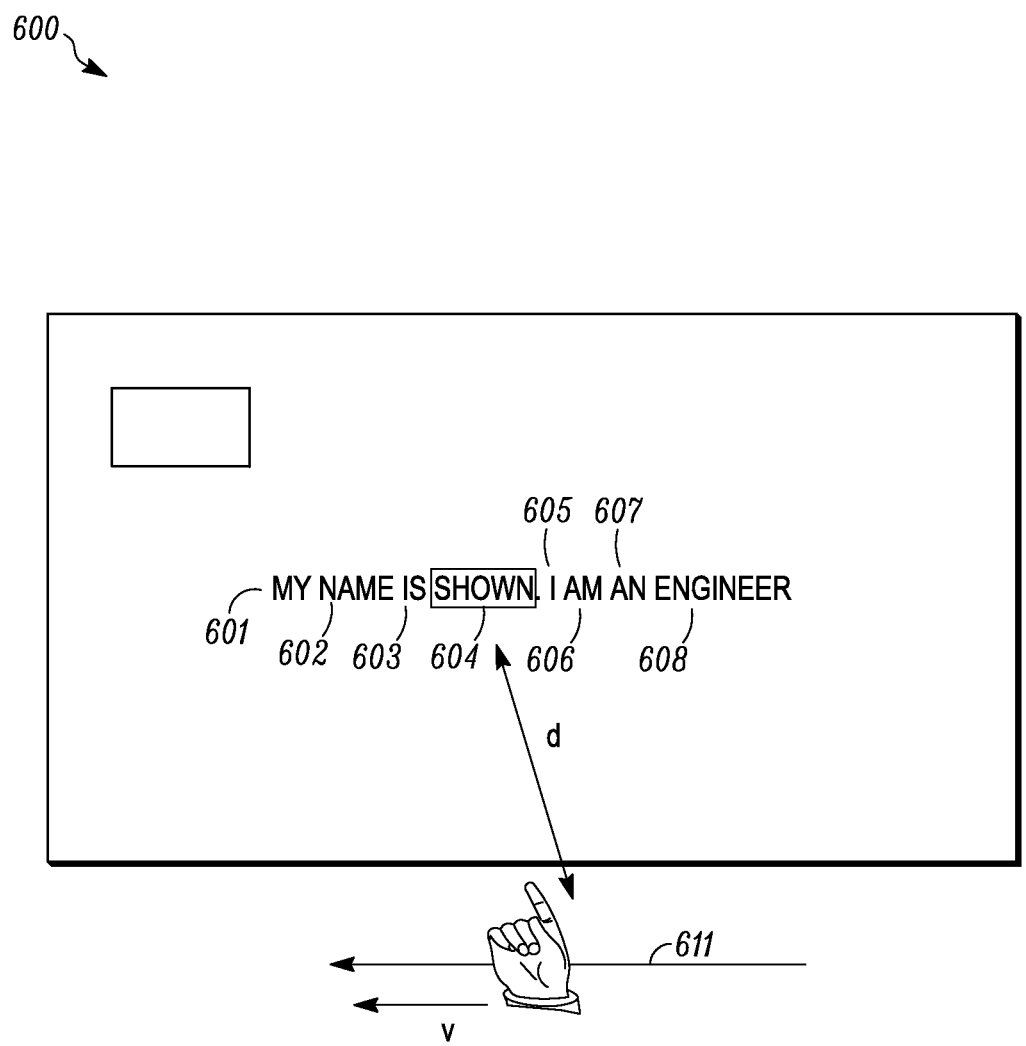

Referring to FIGS. 6A-6C, there are provided schematic views 600 illustrating another implementation of the electronic device 202. FIGS. 6A-6C show textual words "MY NAME IS SHOWN. I AM AN ENGINEER" represented by the reference numerals 601-608. The electronic device 202 detects a speed v of the gesture. In accordance with the present embodiment, the electronic device 202 stores a predefined value in the memory 218 of FIG. 2. The stored predefined value is a stored reference speed value. The detected speed v is compared to the stored predefined value. If the detected speed v exceeds the stored predefined value, the highlighting jumps one textual word from the plurality of textual words displayed along the path of the direction 611 of the swipe gesture. In other words, every alternate textual word is skipped while highlighting, one by one, the textual words in the direction 611. In accordance with the present embodiment, as shown in FIG. 6A, the first highlighted textual word is textual word 608 "Engineer". The subsequent textual word that is highlighted is textual word 608 "am" as shown in the FIG. 6B. As the swipe gesture moves forward in the direction 611, the next textual word to be highlighted is textual word 604 "Shown" as shown in FIG. 6C. Herein, the highlighting skips one textual word as the swipe gesture moves in the path of the direction 611. In another embodiment, the highlighting may jump more than one textual word if the speed v is more than the predefined speed. For example, not shown herein, if the speed v of the swipe gesture is twice more than the predefined value, the first highlighted word may be textual word 608 "Engineer" and the subsequent highlighted word can be the textual word 605 "I". Herein, the highlighting jumps or skips more than one textual word as the contactless swipe gesture, with speed v, moves in the path of the direction 611.

In the present embodiment, the electronic device 202 may detect the relative distance d between the swipe gesture and the electronic device. The electronic device compares the detected distance d with a predefined value, stored in the memory 218. The predefined value is a reference distance value. If the detected distance is less than the predefined value, highlighting jumps one textual word from the plurality of textual words displayed along the path of the direction 611 of the swipe gesture. In other words, every alternate textual word is skipped while highlighting the textual words in the direction 611. In accordance with the present scenario, the first highlighted textual word is textual word 608 "Engineer". The subsequent textual word that is highlighted is textual word 608 "am" as shown in the FIG. 6B. As the swipe gesture moves forward, the next textual word to be highlighted, when the distance d between the swipe gesture and the electronic device is less than the predefined distance, is textual word 604 "Shown" as shown in FIG. 6C. Herein, the highlighting skips one textual word as the swipe gesture moves in the path of the direction 611. In another embodiment, the highlighting jumps more than one textual words if the speed v is more than the predefined speed. For example, not shown herein, if the distance d of the swipe gesture is more than the predefined value, the first highlighted word can be textual word 608 "Engineer" and the subsequent highlighted word can be textual word 605 "I". Herein, the highlighting jumps or skips more than one textual word as the swipe gesture with speed v moves in the path of the direction 611.

Figure 7A:
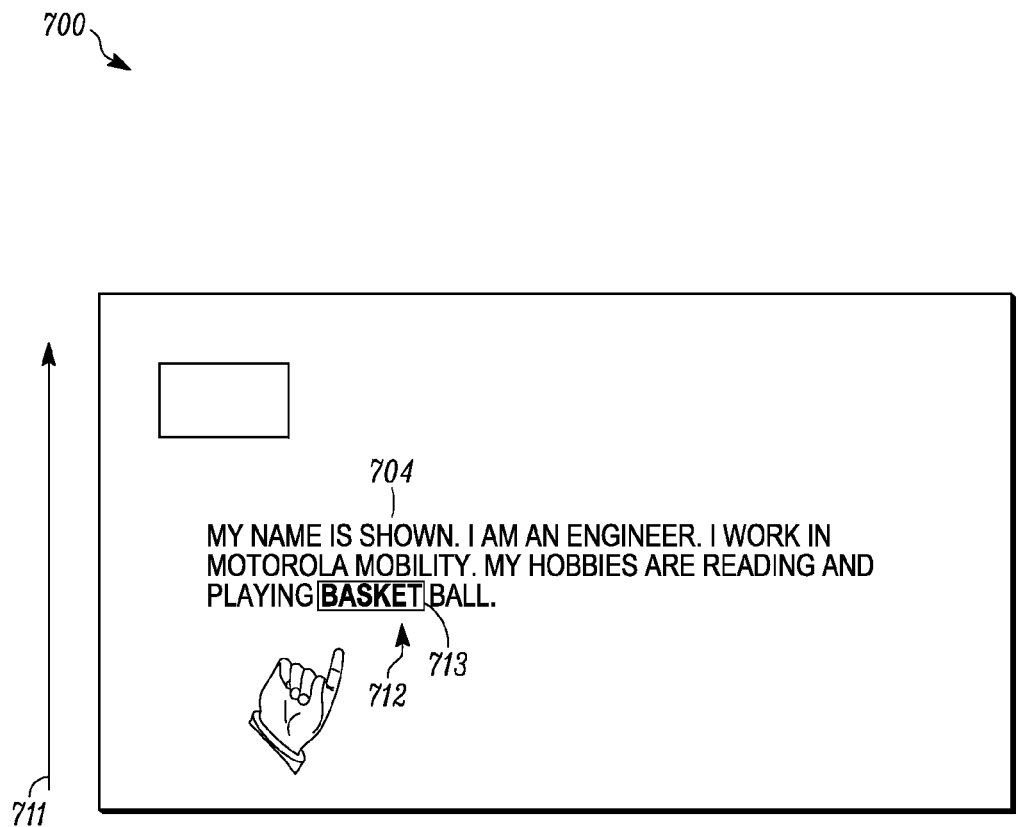
FIGS. 7A-7C are schematic views illustrating an implementation of the electronic device 202.
Figure 7B:
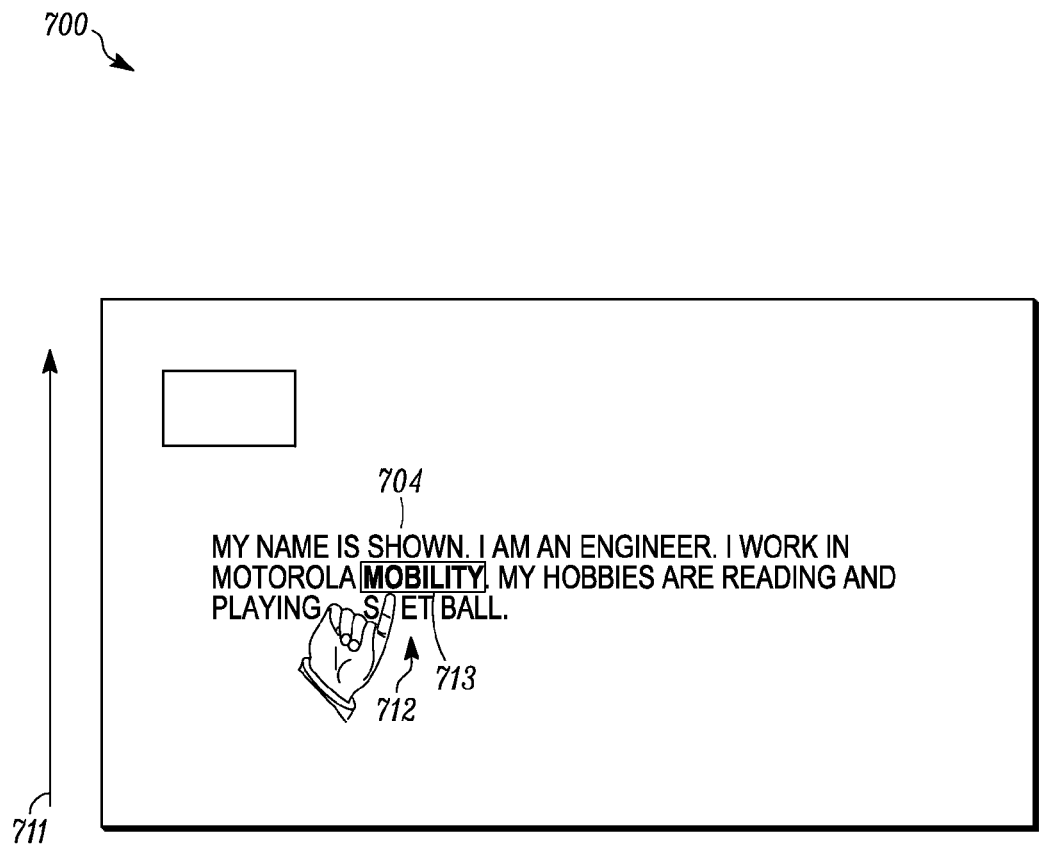
Figure 7C:
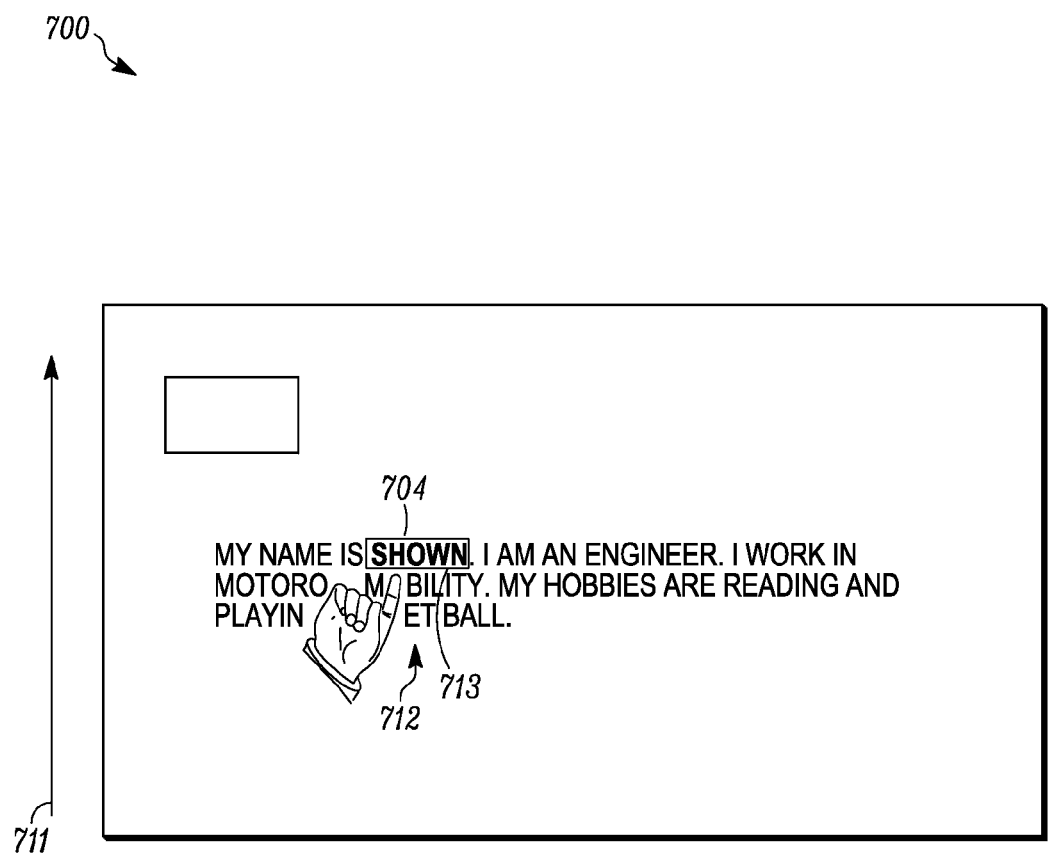
Figure 8A:
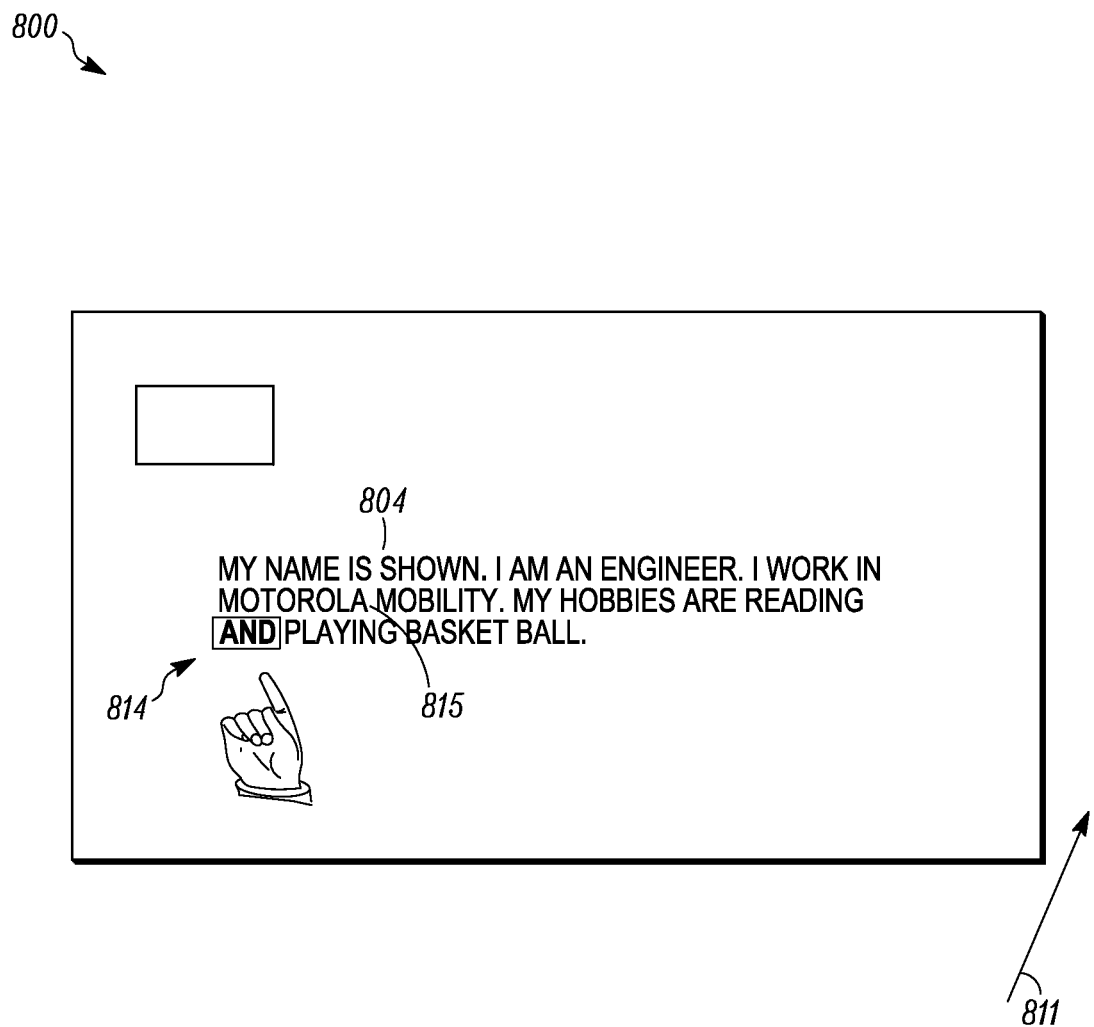
FIGS. 8A-8C are schematic views 800 illustrating an implementation of the electronic device 202.
Figure 8B:
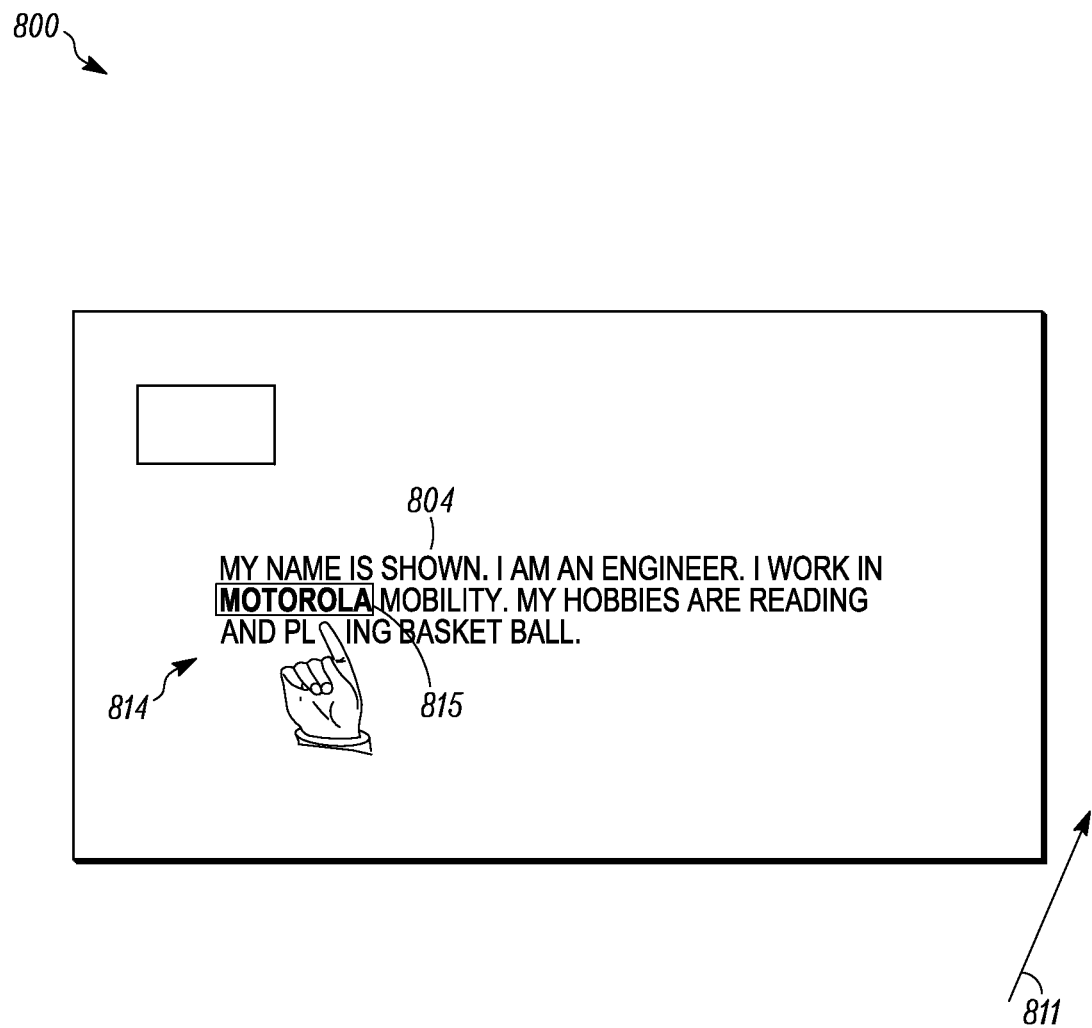
Figure 8C:
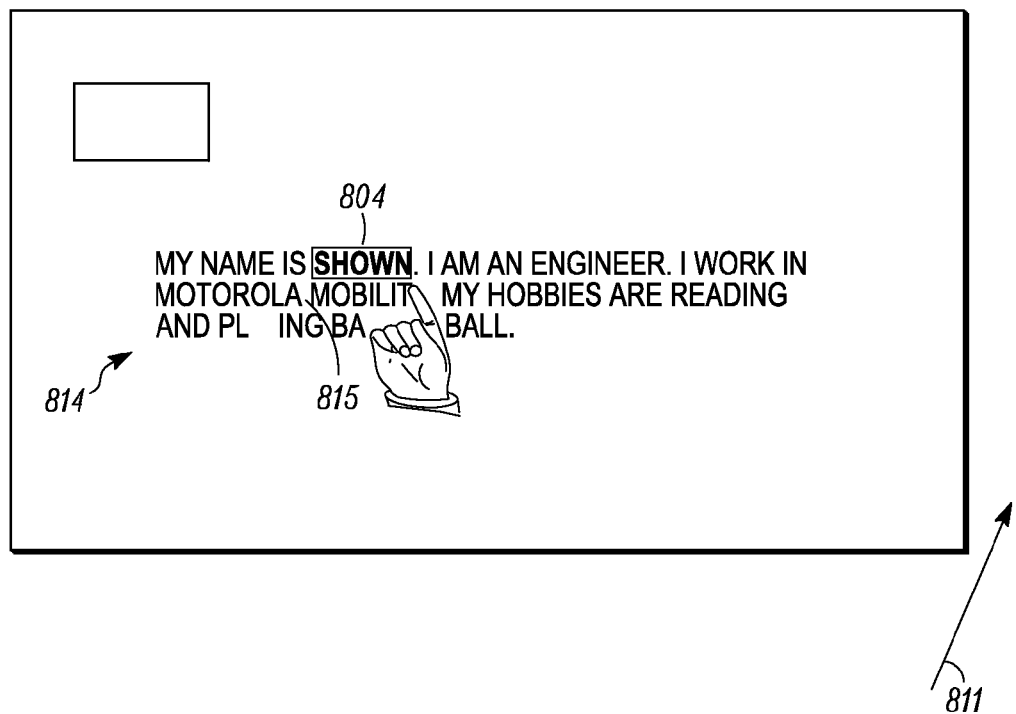

Referring to FIG. 7A, there is provided a schematic view showing a swipe gesture in a direction 711 different from direction 411 of FIGS. 4A-4C and/or direction 611 of FIGS. 6A-6C. For some embodiments, the direction 711 may be orthogonal, or substantially orthogonal, to direction 411 or direction 611. For example, direction 711 may be vertical, or substantially vertical, relative to the displayed text. The swipe gesture can be in various directions. In one embodiment, the swipe gesture moves vertically along the direction 711, wherein the first textual word that is highlighted is textual word 712 "Basket". As the swipe gesture moves along the direction 711, the subsequent words highlighted are textual word 713 "Mobility" and textual word 704 "Shown" as shown in FIGS. 7B and 7C. In another embodiment, the contactless swipe gesture is in a diagonal direction. Referring to FIG. 8A, a schematic view shows a swipe gesture in a direction 811. Herein the first textual word that is highlighted is textual word 814 "and". As the swipe gesture moves along the direction 811, the subsequent words that are highlighted are textual word 815 "Motorola" and textual word 804 "Shown" as shown in FIGS. 8B and 8C.

Figure 9A:
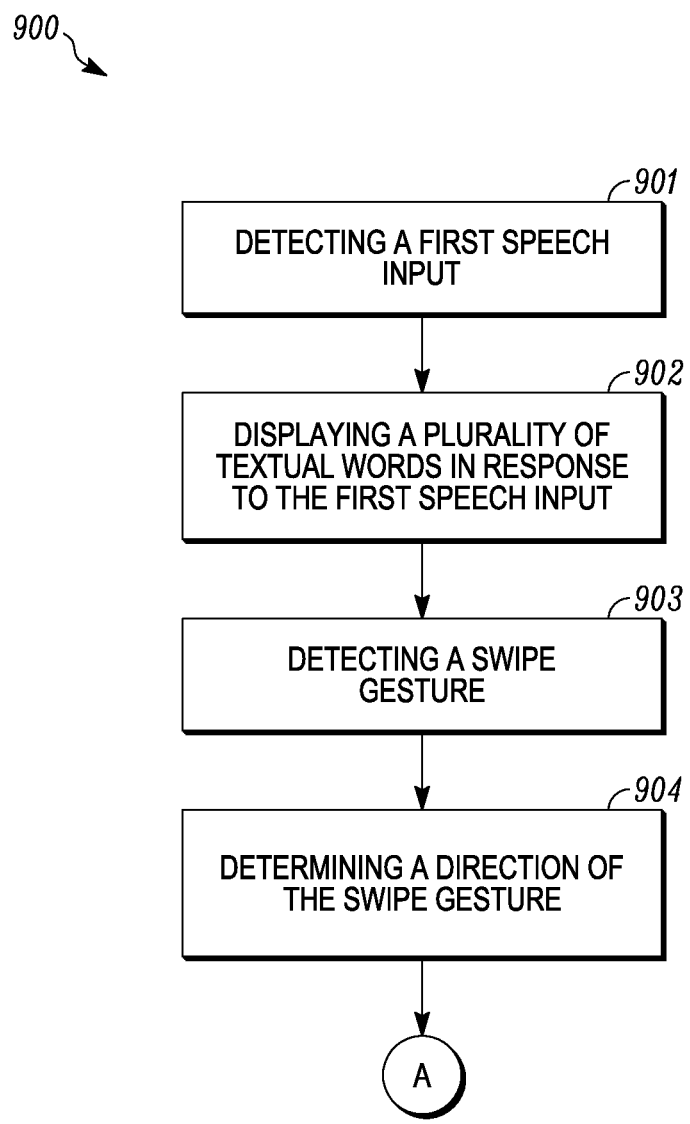
FIGS. 9A-9B are flowcharts showing example steps of an operation of the electronic device, in accordance with some embodiments of the present invention.
Figure 9B:
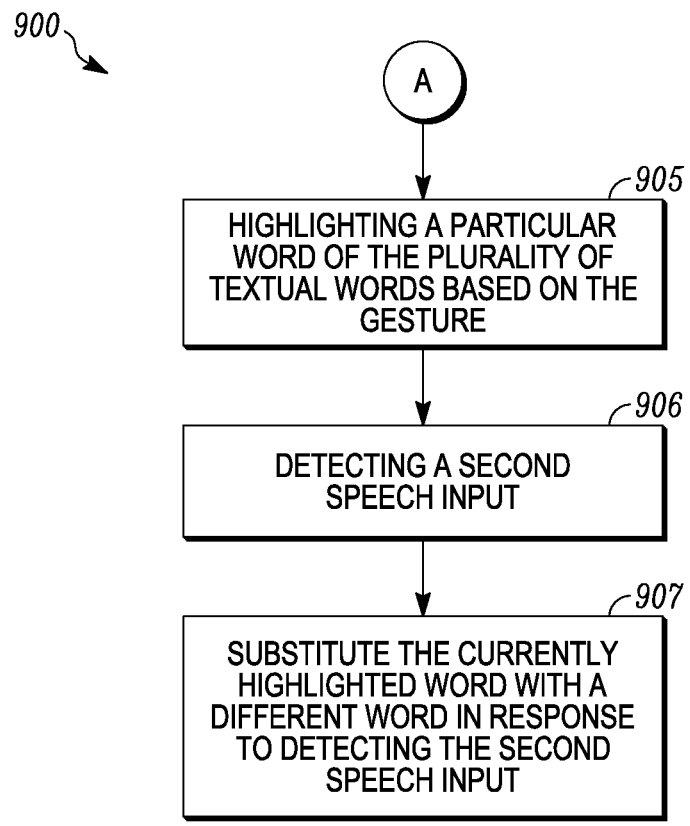

Referring to FIG. 9, a method 900 is provided showing example steps of performing the steps of the present invention. In accordance with the present embodiment, in step 901 the speech recognition system detects a speech input. The speech input is provided by a user or a speaker 320. In step 902, the processor 214, in response to detection of speech by the speech recognition system 230, displays a plurality of textual words on a screen of the electronic device. The user recognizes a misspelled displayed textual word of the plurality of textual words and initiates a swipe gesture across the electronic device. The gesture recognition system detects the swipe gesture as shown in step 903. The gesture recognition system further determines the direction of the swipe gesture as shown in step 904. In step 905, the processor highlights each textual word of the plurality of textual words that are displayed in the path of the direction of the swipe gesture. The processor dehighlights, one by one, previously highlighted textual word while highlighting the subsequent textual word. As the highlighting reaches misspelled textual word, the user provides a second speech input. The second speech input is detected again, in step 906, by the speech recognition system and, the processor 214 substitutes the misspelled textual word with a new textual word as shown in step 907. In other words, the new textual word replaces the previous misspelled textual word.

Referring to FIG. 10, a method 1000 is provided showing example steps of performing the steps of the present invention. In accordance with the present embodiment, in step 1001 the speech recognition system detects a speech input. The speech input is provided by a user or a speaker holding, or is otherwise in proximity to, the electronic device. The proximity of the user or speaker is defined by a distance that is no further than what is required for speech recognition. In step 1002, the processor 214, in response to detection of speech by the speech recognition system, displays a plurality of textual words on a screen of the electronic device. For example, the textual words may be provided as a phrase or sentence as dictated by the user. For this embodiment, the user may realize or discover a misspelled textual word and, thus, initiates a swipe gesture, touch or contactless, across the electronic device. As a result, the gesture recognition system would detect the swipe gesture of the user at step 1003. The gesture recognition system may determine a direction of the at least one swipe gesture and also determine a type of the at least one swipe gesture, in which the type may includes a first type and a second type. The processor 214 controls, or the display 210 provides, highlighting one-by-one for each swipe gesture of the at least one swipe gesture, each textual word being displayed along a path of the direction of the swipe gesture at step 1004.

Where the type of the at least one swipe gesture is determined, a textual word adjacent to a highlighted word is highlighted instead of the highlighted word for the first type of the at least one touch or contactless swipe gesture, and a textual word non-adjacent to the highlighted word is highlighted instead of the highlighted word for the second type of the at least one touch or contactless swipe gesture. It is to be understood that adjacent words are considered to be next to the currently highlighted word in the horizontal, vertical or diagonal direction. Non-adjacent words may be two words away (i.e., skipping a word there between) or even more words away, in the horizontal, vertical or diagonal direction.

Figure 10A:
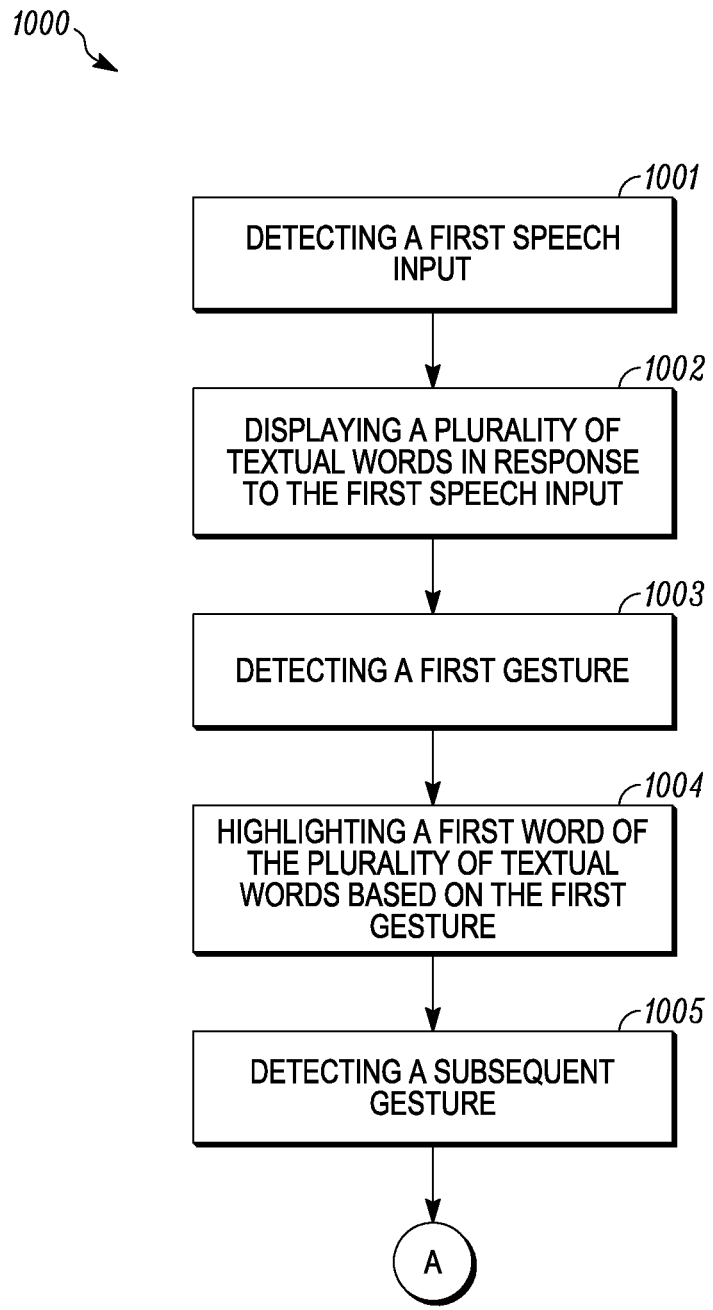
FIGS. 10A-10B are flowcharts showing example steps of another operation of the electronic device, in accordance with some embodiments of the present invention.
Figure 10B:
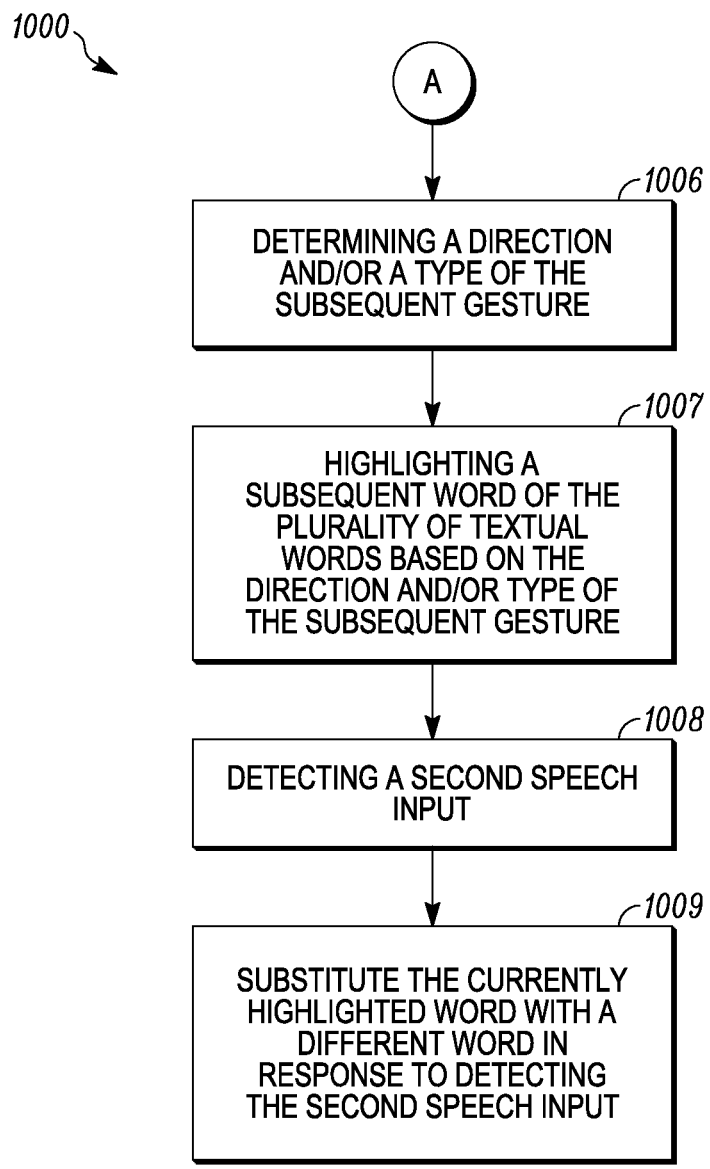

This process of highlighting one-by-one each textual word being displayed along a path of the direction of the swipe gesture may continue for each swipe gesture. As shown in FIG. 10A, subsequent swipe gestures may be detected at step 1005. Continuing with FIG. 10B, the gesture recognition system may determine a direction of the at least one swipe gesture and a type of the at least one swipe gesture, at step 1006, for each swipe gesture. The processor 214 may control, or the display 210 may provide, highlighting one-by-one (but not necessarily adjacent) each textual word being displayed along a path of the direction of the swipe gesture at step 1007.

For some embodiments, the user may wish to correct or modify the highlighted word. In such case, a second speech input may be detected at step 1008 by the speech recognition system, and the processor 214 may substitute the misspelled, or otherwise less-than-desired, textual word with a new textual word as shown in step 1009.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
  detecting, by an electronic device, a first speech input;
  in response to the first speech input, displaying, by the electronic device, a plurality of textual words;
  detecting, by the electronic device, at least one contactless swipe gesture;

determining, by the electronic device, a direction of the at least one contactless swipe gesture;

highlighting, by the electronic device, one-by-one for each contactless swipe gesture of the at least one contactless swipe gesture, each textual word, from the plurality of textual words, being displayed along a path of the direction of the at least one contactless swipe gesture;

detecting, by the electronic device, a second speech input; and in response to detecting the second speech input, substituting, by the electronic device, a highlighted textual word of the path of the direction of the at least one contactless swipe gesture with a second textual word, wherein the second textual word corresponds to the second speech input.

2. The method of claim 1, wherein determining the direction of the at least one contactless swipe gesture further comprises determining, by the electronic device, a speed of the at least one contactless swipe gesture.

3. The method of claim 2, wherein the highlighting of each textual word jumps more than one textual word when the speed of the at least one contactless swipe gesture is more than a predetermined speed.

4. The method of claim 2, wherein the highlighting of each textual word skips a number of textual words of the plurality of textual words, wherein the number of textual words skipped is proportional to a speed of the at least one contactless swipe gesture.

5. The method of claim 1, further comprising determining, by the electronic device, a spatial distance between the at least one contactless swipe gesture and the electronic device.

6. The method of claim 5, wherein highlighting each textual word jumps more than one textual word when the spatial distance is less than a predetermined distance.

7. The method of claim 1, further comprising removing, by the electronic device, one by one for each contactless swipe gesture of the at least one contactless swipe gesture, the highlighting from each highlighted textual word while highlighting another textual word, in the path of the direction of the at least one contactless swipe gesture.

8. The method of claim 1, wherein the direction of the at least one contactless swipe gesture is one of a vertical direction, a horizontal direction, or a diagonal direction.

9. A method comprising:

detecting, by an electronic device, a first speech input;

in response to the first speech input, displaying, by the electronic device, a plurality of textual words, wherein the plurality of textual words includes at least one textual word;

detecting, by the electronic device, at least one swipe gesture;

determining, by the electronic device, a direction of the at least one swipe gesture and a type of the at least one swipe gesture, wherein the type includes a first type and a second type;

highlighting, one-by-one for each swipe gesture of the at least one swipe gesture, each textual word being displayed along a path of the direction of the swipe gesture, wherein a textual word adjacent to a highlighted word is highlighted instead of the highlighted word for the first type of the at least one swipe gesture, and a textual word non-adjacent to the highlighted word is highlighted instead of the highlighted word for the second type of the at least one swipe gesture; and in response to the first speech input, substituting a highlighted textual word of the path of the direction of the at least one swipe gesture with a second textual word.

10. The method of claim 9, wherein the second type includes a distance between the at least one swipe gesture and the electronic device, wherein the distance is less than a predetermined distance.

11. The method of claim 9, wherein the first type includes a distance between the at least one swipe gesture and the electronic device, wherein the distance is more than a predetermined distance.

12. The method of claim 9, wherein the first type includes a speed of the at least one swipe gesture, wherein the speed is less than a predetermined speed.

13. The method of claim 9, wherein the second type includes a speed of the at least one swipe gesture, wherein the speed is more than a predetermined speed.

14. The method of claim 9, wherein the direction of the at least one swipe gesture is one of a vertical direction, a horizontal direction, or a diagonal direction.

15. The method of claim 9, further comprising removing, by the electronic device, one by one for each swipe gesture of the at least one swipe gesture, the highlighting from each highlighted textual word while highlighting another textual word in the path of the direction of the at least one swipe gesture.

16. The method of claim 9, wherein detecting the at least one swipe gesture comprises detecting the at least one swipe gesture by at least one of an IR sensor, an optical imager, and an ultrasonic sensor.

17. An electronic device comprising:

a housing;

a display supported by the housing;

a power source supported by the housing;

a speech recognition module configured to detect a first speech input and a second speech input;

a gesture recognition module configured to detect at least one contactless swipe gesture and determine a direction of swipe gesture; and a processor configured to output, for display by the display, a plurality of textual words in response to the first speech input, highlight, one by one, each textual word being displayed along a path of the direction of the swipe gesture, and substitute, when the second speech input is detected, a highlighted textual word with a second textual word, wherein the second textual word corresponds to the second speech input.

18. An electronic device comprising:

a housing;

a display supported by the housing;

a power source supported by the housing;

a speech recognition module configured to detect a first speech input;

a gesture recognition module configured to detect a swipe gesture and determine a direction and a type of at least one swipe gesture, wherein the type includes a first type and a second type; and a processor configured to display a plurality of textual words in response to the first speech input, highlight, one-by-one for each swipe gesture of the at least one swipe gesture, each textual word being displayed along a path of the direction of the swipe gesture, wherein a textual word adjacent to a highlighted word is highlighted instead of the highlighted word for the first type of the at least one swipe gesture, and a textual word non-adjacent to the highlighted word is highlighted instead of the highlighted word for the second type of the at least one swipe gesture, and substitute a highlighted textual word of the path of the direction of the at least one contactless swipe gesture with a second textual word in response to detecting the second speech input, wherein the second textual word corresponds to the second speech input.

19. The electronic device of claim 18, wherein the processor is configured to remove, one by one for each swipe gesture of the at least one swipe gesture, the highlighting from each highlighted textual word while highlighting another textual word in the path of the direction of the at least one swipe gesture.

20. The electronic device of claim 18, wherein the first type or the second type includes one or more of a distance between the at least one swipe gesture and the electronic device and a speed of the at least one swipe gesture, wherein the distance is less than a predetermined distance, and wherein the speed is more than a predetermined speed.

* * * * *